United States Patent
Bou-Ghannam et al.

(10) Patent No.: US 7,243,155 B2
(45) Date of Patent: Jul. 10, 2007

(54) TELECOMMUNICATION SERVICE REGISTRY

(75) Inventors: Akram A. Bou-Ghannam, Lake Worth, FL (US); Thomas E. Creamer, Boca Raton, FL (US); Victor S. Moore, Boynton Beach, FL (US); Vishwanath Narayan, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 10/314,660

(22) Filed: Dec. 9, 2002

(65) Prior Publication Data

US 2004/0111429 A1 Jun. 10, 2004

(51) Int. Cl.
*G06F 156/16* (2006.01)

(52) U.S. Cl. .................. 709/230; 710/203; 710/204

(58) Field of Classification Search .................. None
See application file for complete search history.

(56) References Cited

U.S. PATENT DOCUMENTS

| | | | |
|---|---|---|---|
| 5,596,723 A | 1/1997 | Romohr | 395/200.16 |
| 6,195,678 B1 | 2/2001 | Komuro | 709/202 |
| 2001/0047386 A1 | 11/2001 | Domenikos et al. | 709/203 |
| 2001/0049632 A1 | 12/2001 | Rigole | 705/26 |
| 2002/0029260 A1 | 3/2002 | Dobbins et al. | 709/219 |
| 2002/0032754 A1 | 3/2002 | Logston et al. | 709/219 |
| 2002/0032768 A1 | 3/2002 | Voskuil | 709/224 |
| 2003/0084177 A1* | 5/2003 | Mulligan | 709/230 |
| 2005/0136949 A1* | 6/2005 | Barnes | 455/461 |

FOREIGN PATENT DOCUMENTS

| | | |
|---|---|---|
| WO | WO 00/55787 | 9/2000 |
| WO | WO 00/67183 | 11/2000 |

\* cited by examiner

*Primary Examiner*—Charles Rones
*Assistant Examiner*—Belix M. Ortiz
(74) *Attorney, Agent, or Firm*—Akerman Senterfitt

(57) ABSTRACT

A system for presenting telecommunication services to potential customers can include a distributed, platform independent registry disposed within a publicly accessible network. The registry can include a plurality of entries, each entry specifying at least one telecommunication service, wherein selective ones of the telecommunication services can be provided by two or more providers. Each entry can further contain connectivity information for contacting an associated one of the providers across a publicly accessible network in order to obtain the telecom service from the provider. Each of the telecommunication services can be configured to function within multiple switch environments.

39 Claims, 2 Drawing Sheets

TELECOMMUNICATION SERVICE REGISTRY

BACKGROUND OF THE INVENTION

1. Technical Field

The present invention relates to the field of telecommunications and, more particularly, to a publicly accessible registry listing telecommunication services.

2. Description of the Related Art

Telecommunication (telecom) companies offer customers numerous telecom services, such as caller ID, voice mail, and three way calling, either singularly or as part of a telecom package. As sales and usage of personal telecom devices, such as cellular telephones and personal data assistants (PDAs), have increased, the demand for telecom services has escalated. Unfortunately, the marketplace for telecom services has not kept pace with increasing consumer demands.

One reason the supply for telecom services has failed to fulfill the demand can originate from the manner in which telecom services are implemented. Generally, telecom services are developed specifically for a particular telecom switch. Development of new services typically requires specialized personnel having a significant amount of experience in programming a particular telecom switch upon which a telecom service is to be implemented. Further adding to the cost of telecom service development, is the fact that telecom services are not easily ported from one type of telecom switch to another. Consequently, similar and like features must be redesigned for each switch.

Moreover, a confused marketplace exists for telecommunication services. First, no agreed upon standardized set of terms or phrases describing telecom services exists through which meaningful comparisons among services can be made. Additionally, an existing customer base has been trained to select packages of telecom services instead of choosing among individual telecom services capable of suiting individual requirements. In consequence, consumers do not request individual telecom services in a competitive fashion.

Telecom carriers also lack the ability to exchange and transfer individual services among themselves responsive to consumer demand. For example, suppose a first telecom service provider supplied a three way calling service desirable to a selected business, but that business needed caller ID features which are not available through the first telecom provider. Absent some third party bundling of a caller ID feature to be included with the first provider's telecom service, the business would not be able to utilize the desirable three way calling service. Similarly, customers transferring from one telecom carrier to another are typically forced to discontinue telecom services proven satisfactory, merely because such services are not supported by the new telecom carrier.

Many industry leaders have directed efforts that focus upon expanding the portability of telecom services and increasing the pool of available developers. For example, such standardization efforts as Intelligent Networks (IN), Advanced Intelligent Networks (AIN) and Java Advanced Intelligent Network (JAIN®) focus upon providing a telecom architecture that separates service logic from switching equipment. While these efforts enhance telecom services portability, the efforts do little to create a marketplace wherein suppliers of telecom services can present telecom products to customers.

SUMMARY OF THE INVENTION

The present invention provides a solution that allows providers of telecommunication (telecom) services to present available telecom services to requesters of such services. In particular, the present invention utilizes a publicly accessible registry as a marketplace for telecom services. Accordingly, telecom service providers can post available telecom service descriptions to the registry. Thereafter, requesters can search the registry for desired telecom services. Notably, each requester is not limited to only those telecom services or service packages provided by a single source. Rather, each requester can select one or more services from one or more providers. Upon request, providers can assure installation of one or more specified services within a telecom network, so that such specified services are made available to the requester.

One aspect of the present invention can include a system for presenting telecom services to potential customers. The system can include a distributed, platform independent registry disposed within a publicly accessible network containing a variety of services including telecom services. For example, the registry can be a Universal Description Discovery and Integration (UDDI) compliant registry. Moreover, the registry can include a plurality of entries, each entry specifying at least one telecom service. Selective ones of the telecom services can be provided by two or more providers. For example, the registry can contain a caller ID service acquired from one provider as well as a caller ID service distributed by a different, competing provider.

Moreover, each entry within the registry can contain connectivity information for contacting the provider of a recorded telecom service. For example, the registry can contain port information for accessing a provider's services database. Notably, the connectivity information can be provided in a Web Services Description Language (WSDL) compliant format. Additionally, the offered service can be a Web service and the connectivity information can specify how to establish a Simple Object Access Protocol (SOAP) compliant connection.

Another aspect of the present invention can include a method for marketing telecom services. In this method, a registry can receive at least one telecom service description from one or more providers across a publicly accessible network, such as the Internet. For example, a provider can send a telecom service description to a UDDI compliant registry in a WSDL compliant format. Furthermore, the telecom service description can describe a Web service or a self contained, self describing modular application configured to be published, located, and invoked across the Internet. The received service description can be parsed by the receiving registry creating one or more telecom service entries. The registry can then catalogue the telecom service entries into a directory. Requesters accessing the registry across a publicly accessible network can query this directory for desired telecom services. The registry can search the directory for telecom entries satisfying requester queries and present search results to the requesters.

Yet another aspect of the present invention can include a method of advertising telecom services, wherein a provider can publish a telecom service description of one or more telecom services to a publicly accessible registry across a publicly accessible network. Notably, the telecom service description can be a WSDL compliant message and the registry can be a UDDI complaint registry. Furthermore, the telecom service description can specify a Web service. Moreover, the telecom service description can include connectivity information that can be formatted in a SOAP complaint format. A requester utilizing this connectivity information can establish a connection with the provider across a publicly accessible network, such as the Internet. Upon receiving the telecom service request from the requester, the provider can provide the requested telecom service to the requester.

Another aspect of the present invention can include a method of purchasing telecom services including accessing a publicly accessible registry across a publicly accessible network, such as the Internet. For example, a requester can access a UDDI compliant registry containing telecom services. The requester can then search the registry for one or more telecom services ultimately selecting one or more of such services, which can include one or more Web services. Upon selection, the user can receive a telecom service response for the selected telecom service. The requester can then send a service request to a provider establishing a connection using connectivity information contained within the telecom service response. Notably, the service request can be sent utilizing a SOAP complaint protocol. Once the provider receives the service request, the provider can send the requested telecom service to a telecom carrier for installation. Alternately, the provider can transfer the telecom service to the requester. The requester can then send the telecom service to a telecom carrier for installation.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a solution for presenting telecommunication (telecom) services utilizing a publicly accessible registry. Telecom services grant particular connectivity capabilities to communication devices, such as call waiting or caller ID. By presenting such services within a publicly accessible registry, individual customers can make informed telecom service selections from among various providers. Notably, customers are not limited to packaged telecom services provided by individual providers, but can instead select one or more services from one or more providers. Responsive to customer selection, specified services can be installed onto a telecom network granting the customer the capabilities of the selected service(s).

One skilled in the art can appreciate that while standard telephony services, such as caller ID, are certainly one subset of telecom services, telecom services can extend beyond present telephone based services. For example, a telecom service can convey photographs, video, documents, and other multimedia objects, as well as voice signals creating a complete teleconferencing solution for a given customer. Alternately, a telecom service can determine geographical coordinates of a caller dialing 911 from a cellular telephone. In another example, a telecom service can display Internet based business information whenever a business advertises on television. As information receiving devices, such as telephones, fax machines, television, and computers, become more integrated, often referred to as "convergence" within the telecom field, potential telecom services increase. It should be understood that the invention applies to telecom services generally and is not limited to traditional telephony services or any of the particular examples disclosed herein.

Figure 1:
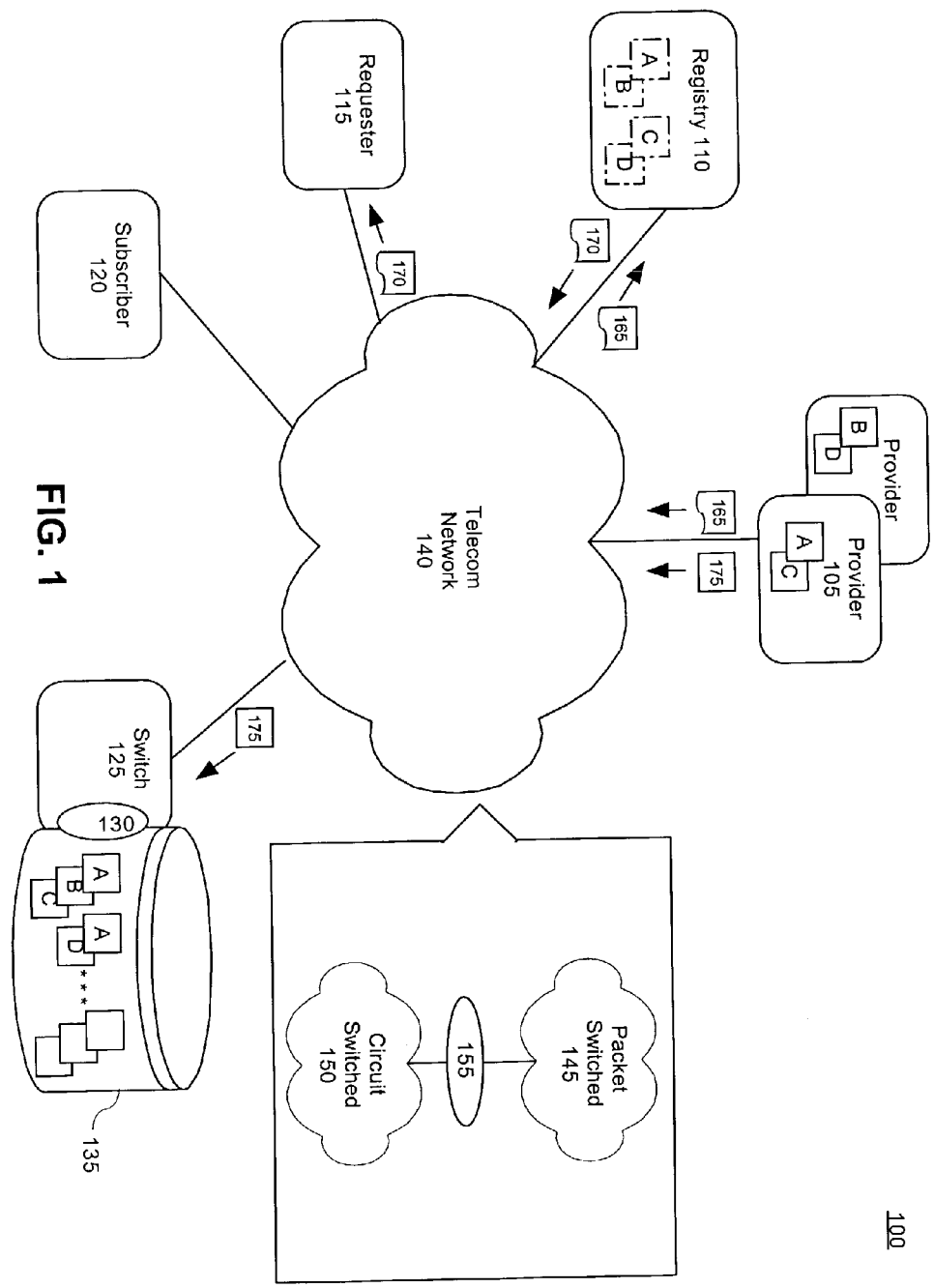
FIG. 1 is a schematic diagram illustrating an exemplary telecommunication system in accordance with the inventive arrangements disclosed herein.

FIG. 1 is a schematic diagram illustrating an exemplary telecom system 100 in accordance with the inventive arrangements disclosed herein. As shown in FIG. 1, the system 100 can include a provider 105, a registry 110, a requester 115, a subscriber 120, and a switch 125, each communicatively linked through a telecom network 140 comprising a packet switched network 145 and a circuit switched network 150 joined by a gateway 155. The provider 105 can be any entity that creates one or more telecom services, such as call waiting, caller ID, call forwarding, voice activated dialing, meet-me conferencing, and the like. For example, provider 105 can be a telecom carrier that both develops and implements telecom services. Alternatively, the provider 105 can be a software development company that specializes in providing telecom services.

Once provider 105 develops a telecom service, a telecom service description 165 for the developed telecom service can be published. Notably, the telecom service description 165 can include descriptive information pertaining to a particular telecom service as well as connectivity information useful for contacting provider 105 across a public network such as the Internet. This connectivity information can facilitate application-to-application document transfers with minimal required human intervention.

For example, in one embodiment, the telecom service description 165 can specify a URL (uniform resource locator) or other network address usable by a requester 115 to contact the provider 105. In another embodiment, once the requester 115 selects a telecom service from registry 110, the requester 115 can be immediately connected to an application of the provider 105. Notably, the connectivity information can be encapsulated within various message formats including, but not limited to, Web Service Description Language (WSDL).

The registry 110 can be a publicly accessible marketplace wherein businesses can present services to customers. Hence, in one embodiment, registry 110 can be a business directory, similar to electronic yellow pages, disposed within the Internet that can facilitate customer/business interactions. The registry 110 in system 100 can include entries for one or more telecom services provided by one or more providers 105. These entries can include, but are not limited to, such information as a service description, a service cost, the terms of a service, and telephony requirements necessary to utilize a service. Notably, services listed within registry 110 can contain information from the telecom service descriptions 165 published by the provider 105. Additionally, registry 110 can include a multitude of business services from divergent subject areas including areas outside the telecom field.

The registry 110 can be a distributed, platform independent registry tailored to foster electronic business services. Services described within registry 110 can include, but are not limited to, self-contained, self describing modular applications configured to be published, located, and invoked across the Web. Such services can be referred to as Web services. Additionally, registry 110 can, but need not, be a Universal Description Discovery and Integration (UDDI) compliant registry.

The requester 115 can be any purchaser of telecom services. For example, a requester 115 can be an individual customer purchasing telephony services for home business usage. Alternatively, requester 115 can be an enterprise that purchases telecom services for packaging and resale, exposing purchased telecom services to multiple subscribers 120. For example, requester 115 can lease a defined amount of bandwidth, purchase selective telecom services, and provide the purchased services to a plurality of end users.

As shown in FIG. 1, requester 115 can search registry 110 for desired telecom services. Exemplary searching mechanisms can include searches by service category, technical specifications, and business name. These searches can occur across a publicly accessible network such as the Web. Once the requester 115 selects a particular telecom service from registry 110, a telecom service response 170 can be relayed from registry 110 to requester 115.

This telecom service response 170 can include information to facilitate communication between a requester 115 and a provider 105. In one embodiment, telecom service response 170 can be identical to telecom service description 165, which can include connection information. In another embodiment, a telecom service response 170 can be different in form from the document submitted by provider 105, yet still include connectivity information that the requester 115 can use to contact provider 105.

Requester 115 can receive telecom service response 170 that includes connectivity information that contains all necessary data required for the requester 115 to establish a connection with the provider 105. For example, telecom service response 170 can specify connectivity information required by the Simple Object Access Protocol (SOAP). Once requester 115 requests a given telecom service, provider 105 can respond by transferring the requested telecom service 175 to the requester 115, using a transfer mechanism such as file transfer protocol (FTP). The requester 115 can subsequently install the received telecom service onto switch 125. Alternately, the provider 105 can install telecom service 175 onto telecom switch 125 directly. Practical implementation details will depend on requirements and standards imposed upon the industry by the owner of telecom switch 125.

The subscriber 120 can be an entity that uses one or more telecom services. For example, subscriber 120 can be a business equipped with a local telephone system for internal communication that nonetheless utilizes a public exchange for external communication. Alternatively, subscriber 120 can be an individual home user. Subscriber 120 either can purchase telecom services directly from provider 105, or can be granted access to telecom services purchased by requester 115.

Notably, telecom services provided to a subscriber can be utilized within any telecom network 140 regardless of the connection methodology of the telecom network 140. As illustrated in FIG. 1, telecom network 140 can include both packet switched network 145 and circuit switched network 150 linked through gateway 155. One of ordinary skill in the art can recognize that while networks 145 and 150 adhere to different messaging protocols, both can utilize the same physical telecom pathways and hardware. Moreover, other logical networks, including such wireless networks as Global Systems for Mobile communication (GSM) and Wireless Application Protocol (WAP), can be included within telecom network 140 as well.

Appreciably, devices such as gateway 155 can be used to translate messages from one messaging protocol to another. Accordingly, gateway 155 can translate a given telecom message from protocol for a circuit switched network 150, such as the public switched telephone network (PTSN), to the protocol required by a packet switched network 145, such as the Web. In another embodiment, gateway 155 can reconcile the message protocols of GSM and WAP. Using gateway 155, a single telecommunication service can be utilized from within the telecom network 140 irrespective of the particular messaging format utilized for message transfer.

Switch 125 can be a terminating device for multiple telecom pathways within the telecom network 140. Moreover, switch 125 can assure that telecom communications are properly routed from an originating subscriber 120 to a receiving subscriber 120. As shown in FIG. 1, the switch 125 can include a telecom service processor 130 and a telecom service repository 135. Switch 125 can be any device connected to the telecommunication network 140 capable of routing telecom communications.

For example, in one embodiment, switch 125 can be a large switch utilized by a telephony carrier within the PSTN. In another embodiment, switch 125 can be a local exchange utilized by a business for intra-business communication. Moreover, switch 125 can be a mobile telecom switch such as those often tactically utilized by the military. In yet another embodiment, switch 125 can be a softswitch configured to be utilized in Voice over Internet Protocol networks.

The telecom service processor 130 can include the hardware/software components that provide a platform upon which telecom services can execute. Hence, telecom service processor 130 can function as an interface between switch 125 and telecom service repository 135. For example, a first telecom service can be implemented in Voice Extensible Markup Language (VXML) and installed within the telecom service repository 135. Additionally, a second telecom service can be implemented using an Intelligent Network (IN) standard and installed within the telecom service repository 135. The hardware and software within the telecom service processor 130 can assure both the first and second telecom services can function within the hardware environment of the switch 125. Physically, telecom service processor 130 can, but need not, be implemented as a series of rack mounted cards within a given telephony switch 125 or as a computer system communicatively linked to the switch 125 via an appropriate gateway interface.

Telecom service repository 135 can contain telecom services developed by providers, including provider 105, and utilizable by subscribers. For example, subscriber 120 can be granted access to stored telecom services A, B, and C shown in FIG. 1. Notably, telecom service repository 135 can contain numerous telecom services developed by numerous telecom providers available to numerous subscribers.

Figure 2:
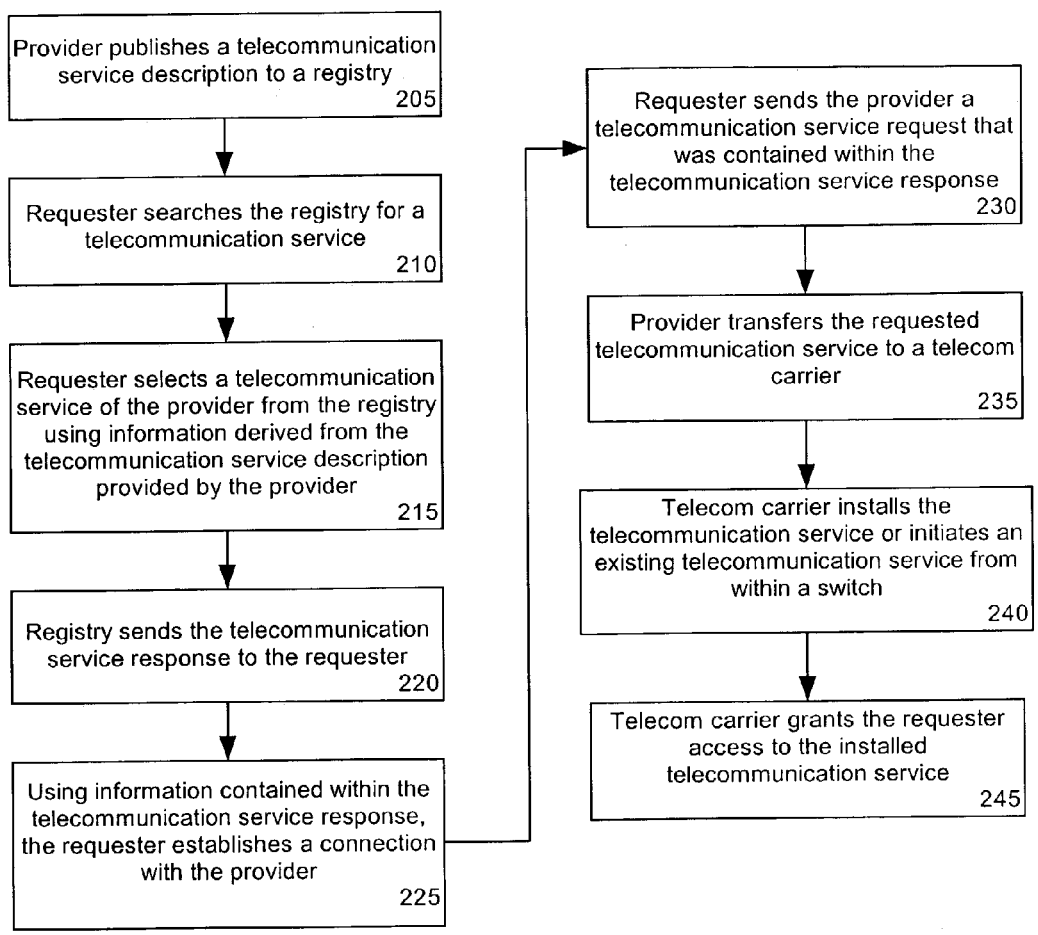
FIG. 2 is a flow chart illustrating a method of presenting, selecting, and implementing telecommunication services utilizing the system of FIG. 1.

FIG. 2 is a flow chart illustrating a method 200 of presenting, selecting, and implementing telecom services for use with the telecom system of FIG. 1. The method 200 can be performed in the context of a telecom system in which providers can develop telecom services capable of operating within multiple switches owned by multiple telecom carriers. Furthermore, in method 200, each of the multiple telecom carriers can allow telecom services of the providers to be installed onto telecom hardware utilized for relaying subscriber communications.

The method 200 can begin in step 205, where a provider submits a telecom service description to a registry. Once the registry receives a submission from a provider, the registry can perform checks to assure that the provider is approved for submissions. Assuming the provider is authorized and the submission is determined to be genuine, the registry can then store the submitted information. In order to store the submitted information, the provider can parse the received submission into component elements. These component elements can then be stored in a manner compliant with the provider's data repository.

For example, a provider having developed a three way calling telecom service can submit a WSDL message detailing the three way calling service to a UDDI registry. The registry can then convert the received message into searchable entries compliant with UDDI protocols. Appreciably, the invention is not limited to any particular registry type or any particular message subscription format.

In step 210, a requester can establish a communication link and search the registry for a telecom service. In one embodiment, the requester can look up a particular provider in an alphabetized listing or white pages. Alternately, the requester can search a taxonomy section or yellow pages for all providers of a particular service type or category. In yet another embodiment, the registry can allow a requester to seek telecom services based upon particularized specifications or technical parameters. Notably, the registry can be publicly accessed and searched by many requesters.

In step 215, a requester can select a telecom service from the telecom registry. Once selected, in step 220, the registry can send a telecom service response to the requester. Notably, this telecom service response can, but need not, be identical to the telecom service description submitted by the provider. Regardless of the exact format of the telecom service response, such a description can contain information which the requester's computer can use to automatically initiate contact with the provider. For example, the telecom service response can include connectivity information allowing a SOAP connection to be established between the requester and the provider. Accordingly, a connection can be established with the provider in step 225.

Subsequent to the communication link being established, as shown in step 230, the requester can send a telecom service request to the provider across the established link. This telecom service request can include a message that was contained within the telecom service description. For example, the telecom service description, in addition to containing descriptive information about a three way calling telecom service, can also contain a request code capable of being understood by the provider. Accordingly, the request code can be transferred with the telecom service response sent by the registry and submitted by the requester in step 230.

Upon receiving the telecom service request, as shown in step 235, the provider can transfer the specified telecom service along with requestor identifying information to a telecom carrier for installation within a telecom switch. Such a transfer need not be made by the provider directly. For example, in one embodiment, the provider can utilize the File Transfer Protocol (FTP) to send the telecom service to the requester, who in turn can transfer the telecom service to the telecom carrier for installation. In another embodiment, the requested telecom service can already exist within hardware owned by the telecom carrier and need not be transferred again. Instead, a request can be sent to the telecom carrier to initiate the existing telecom service for the requester. Decisions on how such a transfer of the telecom service is to be conducted can be dependant on procedures required by a telecom carrier that owns a given switch. For example, for security reasons, the telecom carrier may choose to accept services only from pre-approved entities, in which case the transferring entity will likely be the provider of the telecom service.

In step 240, the telecom carrier can install the telecom service or initiate the existing telecom service. Upon installation, in step 245, the telecom carrier can grant the requester access to the telecom service. Notably, the requested telecom service can be a Web service, a self contained, self describing modular application configured to be published, located, and invoked across the Web.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system that offers one or more telecommunication services available from one or more service providers of a first network to customers linked to a second network through a switch of the second network and who do not have access to the one or more telecommunication services on the first network, wherein the system installs the one or more telecommunication services on the switch to provide the one or more telecommunication services to the customers on the second network, the system comprising a publicly accessible registry disposed within a publicly accessible network containing a plurality of entries, each entry associated with at least one telecommunication service and containing connectivity information for contacting each provider associated with each telecommunications service across said publicly accessible network in order to obtain said telecommunication service from said provider, and wherein the system configures each telecommunication service to function within multiple switch environments.

2. The registry of claim 1, wherein said registry further comprises at least one entry specifying at least one non-telecommunication service that the system installs on the switch.

3. The system of claim 1, further comprising a telecom service processor operatively coupled to the switch and communicatively coupled to the registry that installs the one or more telecommunication services in a telecom services repository and provides a platform upon which the one or more telecommunication services execute, wherein at least one of said entries in said registry is configured to receive updates from said provider associated with said entry.

4. The system of claim 1, wherein said registry is a universal description discovery and integration (UDDI) compliant registry.

5. The system of claim 3, wherein said registry is updated with a services description language (WSDL) compliant message received from said provider associated with said entry being updated.

6. The system of claim 1, wherein said connectivity information specifies connection parameters necessary to establish a simple object access protocol (SOAP) compliant connection.

7. The system of claim 1, wherein at least one of said telecommunication services is a self contained, self describing modular application that is published, located, and invoked across a public network.

8. A method for providing telecommunication service comprising the steps of:
receiving at least one telecommunication service description from at least one service provider on a first network across a publicly accessible network;
parsing a received telecommunication service description into one or more telecommunication service entries;
storing said telecommunication service entries into a publicly accessible registry disposed in said publicly accessible network;
receiving a telecommunication service query from a requester on a second network for a telecommunication service on the first network across said publicly accessible network;
responsive to said telecommunication service query, searching said registry for qualifying telecommunication service entries;
presenting results of said searching to said requester;
upon a selection of the results, installing one or more telecommunication services that are associated with the qualifying telecommunication service entries on a switch of the second network identified by the telecommunication service query for providing an installed telecommunication service on the switch; and
granting the requestor access to the installed telecommunication service to provide the one or more telecommunication services to a customer on the switch.

9. The method of claim 8, wherein said telecommunication service description further comprises connectivity information that connects the requestor to the provider associated with said telecommunication service on the switch across said publicly accessible network to obtain said telecommunication service from said provider.

10. The method of claim 9, wherein said connectivity information specifies how to establish a simple object access protocol (SOAP) compliant connection to said provider.

11. The method of claim 8, wherein said telecommunication service description is formatted in a services description language (WSDL) complaint format.

12. The method of claim 8, wherein at least one of said telecommunication service descriptions describes a Web service.

13. A method of advertising telecommunication services by a service provider comprising the steps of:
publishing a telecommunication service description of one or more telecommunication services of said provider to a publicly accessible registry across a publicly accessible network, wherein said telecommunication service description comprises connectivity information;
receiving a connection request from a requester application that utilizes said connectivity information;
establishing a connection between said requester application and a provider application across said publicly accessible network;
receiving a telecommunication service request from said requester across said established connection for a telecommunication service on a first network that is not available on a second network; and,
installing the telecommunication service on a switch of the second network to provide said telecommunication service specified by said telecommunication service request to a mobile device on the second network.

14. The method of claim 13, wherein said publicly accessible registry is a universal description discovery and integration compliant (UDDI) registry.

15. The method of claim 13, wherein said telecommunication service description is formatted in a services description language (WSDL) complaint format.

16. The method of claim 13, wherein said connectivity information specifies how to establish a simple object access protocol (SOAP) compliant connection to said provider application.

17. The method of claim 13, wherein at least one of said telecommunication services is a Web service.

18. A method of purchasing telecommunication services comprising the steps of:
accessing a publicly accessible registry of one or more telecommunication services available across a publicly accessible network;
searching said publicly accessible registry for at least one telecommunication service;
responsive to results of said searching, selecting at least one telecommunication service;
receiving a telecommunication service description for said selected telecommunication service, wherein said telecommunication service description specifies connectivity information for connecting to a provider of said selected telecommunication service;
sending a telecommunication service request to said provider across said publicly accessible network using said connectivity information;
installing the at least one telecommunication service on a switch to provide said telecommunication service specified by said telecommunication service request and,
receiving requested services through a telecommunication carrier corresponding to the switch providing said selected telecommunication service.

19. The method of claim 18, wherein said publicly accessible registry is a universal description discovery and integration (UDDI) compliant registry.

20. The method of claim 18, wherein said telecommunication service response is formatted in a services description language (WSDL) complaint format.

21. The method of claim 18, wherein said sending step utilizes a simple object access protocol (SOAP) compliant mechanism.

22. The method of claim 18, wherein at least one of said telecommunication services is a Web service.

23. The method of claim 18, further comprising the steps of:
receiving said selected telecommunication service from said provider across said publicly accessible network; and,
sending said selected telecommunication service to said telecommunication carrier for installation.

24. A machine readable storage having stored thereon, a computer program having a plurality of code sections, said code sections executable by a machine for causing the machine to perform the steps of:
- receiving at least one telecommunication service description from at least one service provider on a first network across a publicly accessible network;
- parsing a received telecommunication service description into one or more telecommunication service entries;
- storing said telecommunication service entries into a publicly accessible registry disposed in said publicly accessible network;
- receiving a telecommunication service query from a requester on a second network for a telecommunication service on the first network across said publicly accessible network;
- responsive to said telecommunication service query, searching said registry for qualifying telecommunication service entries;
- presenting results of said searching to said requester;
- upon a selection of the results, installing one or more telecommunication services that are associated with the qualifying telecommunication service entries on a switch of the second network identified by the telecommunication service query for providing an installed telecommunication service on the switch; and
- granting the requestor access to the installed telecommunication service to provide the one or more telecommunication services to a customer on the switch.

25. The machine readable storage of claim 24, wherein said telecommunication service description further comprises connectivity information allowing said requester to connect to a provider associated with said telecommunication service across said publicly accessible network in order to obtain said telecommunication service from said provider.

26. The machine readable storage of claim 25, wherein said connectivity information specifies how to establish a simple object access protocol (SOAP) compliant connection to said provider.

27. The machine readable storage of claim 24, wherein said telecommunication service description is formatted in a services description language (WSDL) complaint format.

28. The machine readable storage of claim 24, wherein at least one of said telecommunication service descriptions describes a Web service.

29. A machine readable storage having stored thereon, a computer program having a plurality of code sections, said code sections executable by a machine for causing the machine to perform the steps of:
- publishing a telecommunication service description of one or more telecommunication services of a service provider to a publicly accessible registry across a publicly accessible network, wherein said telecommunication service description comprises connectivity information;
- receiving a connection request from a requester application that utilizes said connectivity information;
- establishing a connection between said requester application and a provider application across said publicly accessible network;
- receiving a telecommunication service request from said requester across said established connection for a telecommunication service on a first network that is not available on a second network; and,
- installing the telecommunication service on a switch of the second network to provide said telecommunication service specified by said telecommunication service request to a mobile device on the second network.

30. The machine readable storage of claim 29, wherein said publicly accessible registry is a universal description discovery and integration compliant (UDDI) registry.

31. The machine readable storage of claim 29, wherein said telecommunication service description is formatted in a services description language (WSDL) complaint format.

32. The machine readable storage of claim 29, wherein said connectivity information specifies how to establish a simple object access protocol (SOAP) compliant connection to said provider application.

33. The machine readable storage of claim 29, wherein at least one of said telecommunication services is a Web service.

34. A machine readable storage having stored thereon, a computer program having a plurality of code sections, said code sections executable by a machine for causing the machine to perform the steps of:
- accessing a publicly accessible registry of one or more telecommunication services available across a publicly accessible network;
- searching said publicly accessible registry for at least one telecommunication service;
- responsive to results of said searching, selecting at least one telecommunication service;
- receiving a telecommunication service description for said selected telecommunication service, wherein said telecommunication service description specifies connectivity information for connecting to a provider of said selected telecommunication service;
- sending a telecommunication service request to said provider across said publicly accessible network using said connectivity information;
- installing the at least one telecommunication service on a switch to provide said telecommunication service specified by said telecommunication service request; and,
- receiving requested services through a telecommunication carrier corresponding to the switch providing said selected telecommunication service.

35. The machine readable storage of claim 34, wherein said publicly accessible registry is a universal description discovery and integration (UDDI) compliant registry.

36. The machine readable storage of claim 34, wherein said telecommunication service response is formatted in a services description language (WSDL) complaint format.

37. The machine readable storage of claim 34, wherein said sending step utilizes a simple object access protocol (SOAP) compliant mechanism.

38. The machine readable storage of claim 34, wherein at least one of said telecommunication services is a service.

39. The machine readable storage of claim 34, further comprising the steps of:
- receiving said selected telecommunication service from said provider across said publicly accessible network; and,
- sending said selected telecommunication service to said telecommunication carrier for installation.

* * * * *